United States Patent [19]

Mori

[11] 4,060,272
[45] Nov. 29, 1977

[54] WEATHERSTRIP

[76] Inventor: Kenichi Mori, No. 714, Nishiterao-cho, Kanagawa, Yokohama, Japan

[21] Appl. No.: 654,741

[22] Filed: Feb. 3, 1976

[30] Foreign Application Priority Data

Mar. 17, 1975 Japan .............................. 50-35728[U]

[51] Int. Cl.² ............................................. B60J 1/17
[52] U.S. Cl. ........................................ 296/93; 49/493
[58] Field of Search .................... 296/93; 49/480, 483, 49/485, 486, 489, 490, 491, 493, 495, 498, 499

[56] References Cited

U.S. PATENT DOCUMENTS

| 2,705,655 | 4/1955 | Brown | 49/495 X |
| 2,737,412 | 3/1956 | Smith | 49/493 |

FOREIGN PATENT DOCUMENTS

| 711,051 | 6/1965 | Canada | 49/498 |

*Primary Examiner*—Philip Goodman
*Attorney, Agent, or Firm*—Robert E. Burns; Emmanuel J. Lobato; Bruce L. Adams

[57] ABSTRACT

A weatherstrip is used in a motor vehicle body structure including a roof rail defining an upper side of a window opening and a vehicle door having a window pane movable between raised and lowered position relative to the window opening. The weatherstrip comprises an elongated hollow resiliently deformable member extending along the roof rail. The resiliently deformable member includes an upper mounting portion secured to the roof rail, an inboard lip portion, an outboard lip portion, a bridge portion interconnecting the inboard and outboard lip portions and restraining means disposed within the hollow. The restraining means acts on the upper mounting portion and the bridge portion to prevent the window pane from moving in one direction substantially normal to the plane of the window opening. The restraining means may take the form of a bank formed integral with the upper mounting portion, but separate from the bridge portion. Alternatively, the restraining means may take the form of a bank formed integral with the bridge portion but separate from the upper mounting portion.

7 Claims, 5 Drawing Figures

WEATHERSTRIP

BACKGROUND OF THE INVENTION

The present invention relates to a roof rail weatherstrip for a motor vehicle body structure including a roof rail defining an upper side of a window opening and a vehicle door having a window pane movable between raised and lowered position relative to the window opening.

It is well known that in order to minimize the undesirable and annoying phenomenon known as "wind noise" which may occur at high vehicle operating speeds, a seal must be maintained about the periphery of a vehicle window pane. This is because a great deal of "wind noise" heard during high speed vehicle operation actually is caused by relatively high pressure air from the vehicle passenger compartment passing around the edge of the window pane and into the relatively low-pressure area proximate the outer skin of the moving vehicle.

Maintaining a seal around a vehicle window pane has been rendered more difficult in modern vehicles, especially vehicles which have no frame support for the door window pane. Even though conventional weatherstrips are used to establish a seal about the window periphery, such a seal will be broken upon reduction of pressure in area proximate the outer skin of the motor vehicle as compared to pressure in the passenger compartment. Reduction of pressure normally occurs during high speed vehicle operation. The unsupported window pane then moves outwardly. This outward movement causes the destruction of the seal about the top edge of the window pane.

SUMMARY OF THE INVENTION

It is therefore an object of the present invention to provide a weatherstrip for a motor vehicle body structure capable of making and maintaining an air tight seal about the top edge of an unsupported window pane of a vehicle door during all vehicle operation conditions. In order to accomplish this end, the weatherstrip of the invention is in contact and maintains seal with the window pane during outward movement thereof.

BRIEF DESCRIPTION OF THE DRAWINGS

The above and other objects, features and advantages of the present invention will become clearer from the following description with reference to the accompanying drawings, in which.

DESCRIPTION OF THE PREFERRED EMBODIMENTS

Figure 1:
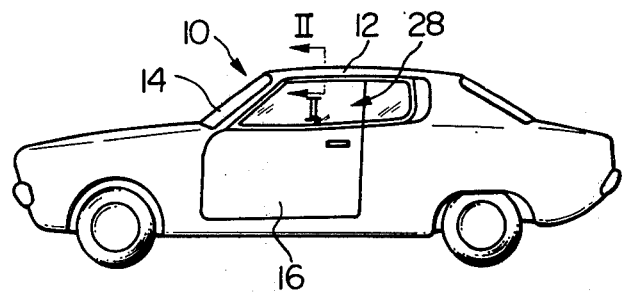
FIG. 1 is a side elevational view of a motor vehicle having a weatherstrip constructed in accordance with the present invention thereon.
Figure 2:
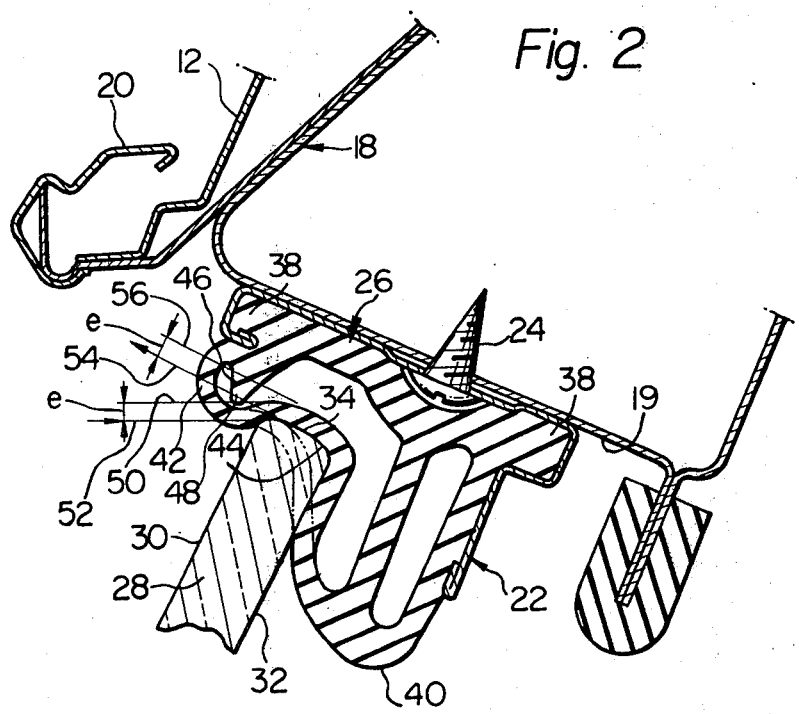
FIG. 2 is an enlarged fragmentary sectional view taken along the line II—II of FIG. 1, with the window pane in its raised position, in which the broken lines show the weatherstrip in its non-deformed condition.

Referring now in detail to the drawings, and more particularly to FIG. 1, the numeral 10 denotes generally a motor vehicle including a weatherstrip constructed in accordance with the present invention. The vehicle 10 includes a body structure such as a roof 12, a windshield 14 and a door 16. The door 16 is conventionally hinged to a body pillar section. As best shown in FIG. 2, the roof 12 has a side roof rail structure designated generally as 18, and a rain gutter 20 is provided to catch water which runs down the side of the roof 12. On the bottom or lower surface 19 of the roof rail 18 is mounted a weatherstrip retainer clip generally designated as 22 by means of a plurality of screws such as 24. The weatherstrip designated generally as 26 is secured to the bottom surface of the roof rail 18 through the retainer clip 22. The bottom surface 19 of the roof rail 18 defines an upper side of a window opening located above the door 16.

A window pane 28 is movable vertically between this window opening and door 16 by means of a conventional window regulator (not shown) located within the door 16. The window pane 28 has an outboard surface 30, an inboard surface 32 and an upper or top edge 34. The window pane 28, when in the raised position illustrated by the solid lines in FIG. 2, is not framed nor does this window pane move in channels. The window pane 28 thus is unsupported against possible lateral movement when in the raised position illustrated by the solid lines in FIG. 2 or by the broken lines in FIG. 3.

The retainer clip 22 secured to the bottom surface 19 of the roof rail 18 has a channel section in which an upper mounting portion 38 of the weatherstrip 26 is fixedly clamped. The weatherstrip 26 includes an elongated hollow resiliently deformable member which has the upper mounting portion 38, an inboard lip portion 40 extending substantially downwardly from the upper mounting portion 38, an outboard lip portion 42 extending from the upper mounting portion 38, a bridge portion 44 interconnecting the inboard and outboard lip portions 40 and 42. It will be seen from FIG. 2 that the upper mounting portion 38, inboard lip portion 40, outboard lip portion 42 and bridge portion 44 define a hollow of the resiliently deformable member. The resiliently deformable member also has an internal projection or internal projection portion 46 extending through the hollow thereof. The internal projection portion 46 is integrally formed with the upper mounting portion 38 but separate from the bridge portion 44. The internal projection portion 46 acts on the upper mounting portion 38 and the bridge portion 44 and serves as a restraining member to prevent the window pane 28 from moving laterally outwardly.

When the weatherstrip 26 is in the non-deformed condition, illustrated by the broken lines in FIG. 2, a tip 48 of the bank portion 46 is positioned above a first plane 50 which is spaced upwardly by a distance e, the distance being corresponding to thickness of the bridge portion 44, from a plane 52 in which the top edge 34 of the window pane 28 will move as the vehicle door 16 (see FIG. 1) is opened or closed and the tip 48 of the internal projection portion 46 is positioned below a second plane 54 which is spaced downwardly by the distance e from a plane 56 in which the top edge 34 will move as the window pane 28 moves outwardly in a direction substantially normal to the plane of the window opening (see FIGS. 2 and 3).

As may be seen in FIG. 2 of the drawings, when the window pane 28 is in the raised position upper portion of the window pane 28 is received between inboard and outboard lip portions 40 and 42 with the top edge 34 of the window pane 28 bearing against the bridge portion 44 and deforming the weatherstrip 26. This deformation provides for the formation of an air tight seal between the weatherstrip 26 and the window pane 28.

Figure 3:
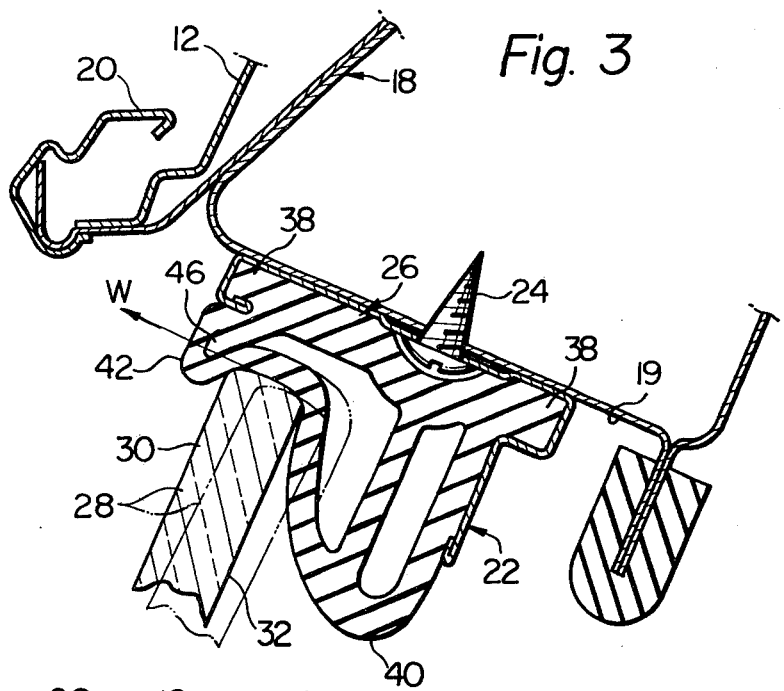
FIG. 3 is a view similar to FIG. 2, but the window pane moving outwardly in a direction substantially normal to the plane of the window opening, in which the broken lines show the weatherstrip with the window pane remaining in the proper position.

In the event that pressure in the area adjacent the outboard surface 30 of the window pane 28 reduces during high speed running of the vehicle, the window pane 28 is urged outwardly in a direction (see arrow W) substantially normal to the plane of the window opening to move from the position illustrated by the broken lines shown in FIG. 3 to the position illustrated by the solid lines shown in FIG. 3. The internal projection portion 46 then abuts against the interior surface of the outboard lip portion 40 and prevents further outward movement of the window pane 28 beyond the solid line position shown in FIG. 3. Thus air tight seal between the weatherstrip 26 and the window pane 28 is maintained, thus preventing "wind noise."

Figure 4:
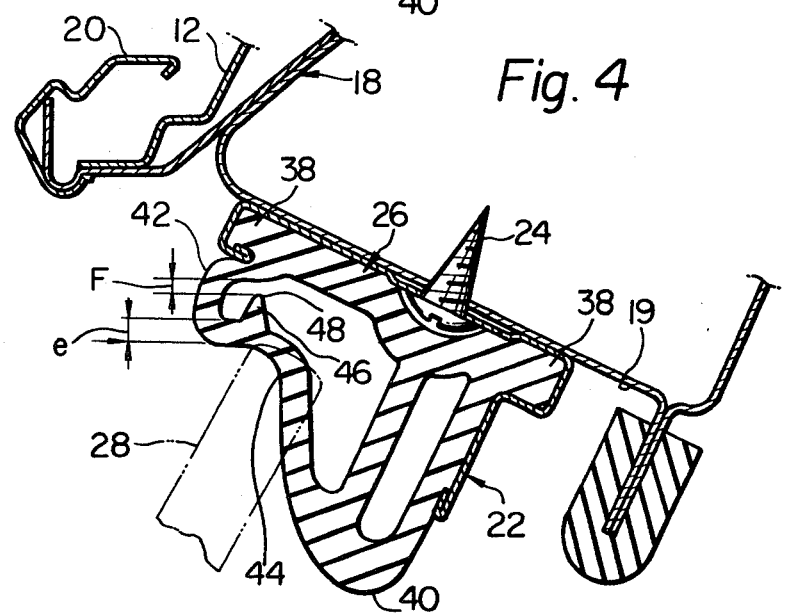
FIG. 4 is a view similar to FIG. 2, illustrating a second embodiment of a weatherstrip according to the present invention, in which the weatherstrip is shown in its non-deformed condition.
Figure 5:
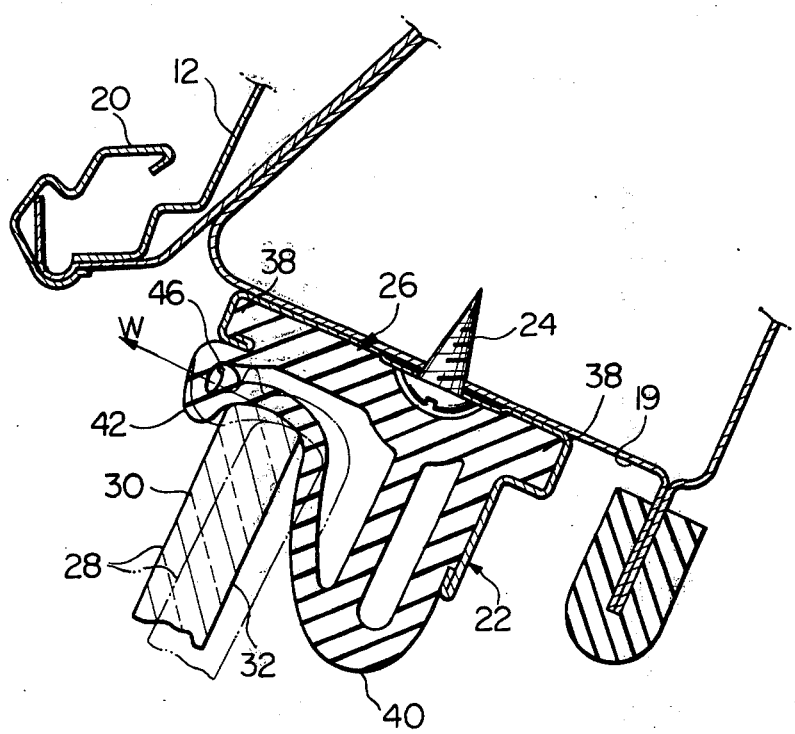
FIG. 5 is a view similar to FIG. 4, but with the window pane moving outwardly in a direction substantially normal to the plane of the window opening, in which the broken lines show the weatherstrip with the window pane remaining in a proper position.

The embodiment shown in FIGS. 4 and 5 is basically similar to the preceding embodiment of FIGS. 2 and 3 and the corresponding parts are designated by the same reference numerals. The difference is that an internal projection portion 46 is formed integral with a bridge portion 44 adjacent an outboard lip portion 42 but separate from an upper mounting portion 38. A tip 48 positioned spaced from the interior surface of an upper mounting portion 38 by a distance F that is greater than a thickness e of the bridge portion 44. This prevents the internal projection portion 46 from hampering the movement of a window pane 28 upon closing and opening of a vehicle door 16. As best seen in FIG. 5 the bank portion 46 is positioned laterally outwardly of outboard surface 30 of the window pane 28 when the window pane 28 is in the position illustrated by the broken lines shown in FIG. 5 and the internal projection portion 46 will abut against the interior surface of an outboard lip portion 42 when the window pane 28 moves from the broken line position shown in FIG. 5 to the solid line position shown in FIG. 5 and will then act as a restraining member to prevent further outward movement of the window pane 28.

It will now be observed from the preceding embodiments that the internal projection portion 46 will maintain the air tight seal between weatherstrip 26 and the window pane 28 even if the weatherstrip 28 moves outwardly due to the difference between a pressure in an area adjacent the outboard surface 30 and a pressure in an area adjacent the inboard surface 32, thus preventing "wind noise."

It will also be observed that the internal projection portion 46 will not hamper opening and closing movement of the vehicle door 16.

It will moreover be observed that the bank portion 46 will be formed easily at the same time when the weatherstrip 28 is extruded. Thus no additional step for forming the internal projection portion 46 is required.

What is claimed is:

1. A weatherstrip in a motor vehicle body structure having a roof rail defining an upper side of a window opening and a vehicle door having a window pane movable between raised and lowered positions relative to the window opening, comprising:
    an elongated, resiliently deformable member extending along the roof rail and having an upper mounting portion secured to the roof rail;
    an inboard lip portion on said member extending in use substantially downwardly from the upper mounting portion; an outboard lip portion on said member extending substantially downwardly from the upper mounting portion a transverse bridge portion opposed to said mounting portion and interconnecting the inboard lip portion and the outboard lip portion; the upper mounting portion, inboard lip portion, outboard lip portion and bridge portion defining the hollow of the resiliently deformable member; and restraining means integral with said member disposed within the hollow coactive with the upper mounting portion and the bridge portion to define a barrier to prevent the window pane from moving in a direction substantially normal to the plane of the window opening and corresponding to a direction outwardly of the vehicle body structure;
    said restraining means comprising an internal projection portion of said elongated resiliently deformable member disposed internally of the hollow and thereinto and disposed outwardly of the outboard surface of the window pane when the vehicle door is closed with the window pane in a raised position, said internal projection portion being integral with said upper mounting portion but separate from said bridge portion.

2. A weatherstrip in a motor vehicle body structure having a roof rail defining an upper side of a window opening and a vehicle door having a window pane movable between raised and lowered positions relative to the window opening, comprising:
    an elongated, hollow, resiliently deformable member extending along the roof rail and having an upper mounting portion secured to the roof rail;
    an inboard lip portion on said member extending substantially downwardly from the upper mounting portion; an outboard lip portion on said member extending substantially downwardly from the upper mounting portion, a bridge portion opposed to the mounting portion and interconnecting the inboard lip portion and the outboard lip portion; the upper mounting portion, inboard lip portion, outboard lip portion and bridge portion defining the hollow of the resiliently deformable member; and restraining means disposed within the hollow coactive with the upper mounting portion and the bridge portion to prevent the window pane from moving in a direction substantially normal to the plane of the window opening;
    said restraining means comprising an internal projection portion interiorly of said elongated resiliently deformable member extending into said hollow and disposed outwardly of the outboard surface of the window pane when the vehicle door is closed with the window pane in the raised position, said internal projection portion being integral with said bridge portion but separate from said upper mounting portion.

3. In a vehicle:
    a vehicle body structure including a window opening, a roof rail defining an upper side of the window opening and a vehicle door having a window pane movable between raised and lowered positions relative to the window opening;

a weatherstrip comprising an elongated hollow resiliently deformable member extending along the roof rail, said elongated hollow resiliently deformable member having, an upper mounting portion secured to the roof rail, an inboard lip portion extending substantially downwardly from the upper mounting portion an outboard lip portion extending substantially downwardly from the upper mounting portion and disposed outwardly of the inboard lip portion, a bridge portion opposed to the upper mounting portion interconnecting the inboard lip portion and the outboard lip portion, the upper mounting portion, and inboard lip portion, the outboard lip portion and the bridge portion defining the hollow of the elongated, hollow resiliently deformable member, and an internal projection portion within the hollow and extending thereinto to limit movement of the window pane in said direction corresponding to a direction substantially normal to and outwardly from the plane of the window opening and disposed so that said movement will flex the bridge portion when the pane is in a raised position to cause the internal projection portion to be pressed between the upper mounting portion and the bridge portion to limit the movement of the window pane in said direction.

4. In a vehicle as claimed in claim 3, in which the internal projection portion is integral with the upper mounting portion, the internal projection portion being disengaged from the bridge portion when the window pane is in the raised position and disposed in the plane of the window opening, and the internal projection portion engaging the bridge portion when the window pane moves in said direction.

5. In a vehicle as claimed in claim 3, in which the internal projection portion is integral with the bridge portion, the internal projection portion being disengaged from the upper mounting portion when the window pane is in the raised position and disposed in the plane of the window opening and the internal projection portion engaging the upper mounting portion when the window pane moves in said direction.

6. In a vehicle as claimed in claim 3, in which the internal projection portion is integral with the upper mounting portion and is disposed outwardly of the outboard surface of the window pane and disengaged from the bridge portion when the vehicle door is closed with the window pane in the raised position and disposed in the plane of the window opening, the internal projection portion engaging the bridge portion when the window pane moves in said direction.

7. In a vehicle as claimed in claim 3, in which the internal projection portion is integral with the bridge portion and is disposed outwardly of the outboard surface of the window pane and disengaged from the upper mounting portion when the vehicle door is closed with the window pane in the raised position and disposed in the plane of the window opening, and the internal projection portion engaging the upper mounting portion when the window pane is moved in said direction.

* * * * *